United States Patent
Bordonali et al.

[15] 3,635,561
[45] Jan. 18, 1972

[54] APPARATUS AND METHOD FOR DETERMINING THE CONTENT OF CHEMICAL ELEMENTS IN A SOLID SAMPLE

[72] Inventors: Corrado Bordonali; Maria Antonietta Biancifiori, both of Rome, Italy

[73] Assignee: Comitato Nazionale per l'Energia Nucleare-Cnen

[22] Filed: Sept. 24, 1970

[21] Appl. No.: 75,188

[30] Foreign Application Priority Data

Oct. 4, 1969 Italy..................................40543-A/69

[52] U.S. Cl. ........................356/85, 250/43.5 R, 250/49.5 P, 250/71 R
[51] Int. Cl............................................................G01j 3/30
[58] Field of Search ....................250/43.5 R, 49.5 R, 49.5 P, 250/71; 356/85

[56] References Cited

UNITED STATES PATENTS 2,381,414   8/1945   Wilkie ....................................250/71
3,217,162   11/1965   Wehner..............................250/49.5 R

*Primary Examiner*—Anthony L. Birch
*Attorney*—Richards & Geier

[57] ABSTRACT

An apparatus is disclosed, to be used in the spectrophotometric analysis of an atomized element, which can be readily shifted from the absorption technique of analysis to the fluorescence technique. In both cases the element to be analyzed is atomized, that is reduced to its basic atomic form by subjecting it to bombardment by the positive ions of a plasma produced within an analysis cell where two electrodes are introduced one of which comprises the element to be analyzed and functions as a cathode. An electric field is applied across said electrodes for producing the plasma while the same electrodes are maintained at a very low temperature by means of a cryogenic fluid and the analysis cell is maintained at a pressure in the range from 0.1 to 50 micron Hg. Some of the apparatus components are readily interchangeable for shifting from the absorption mode of analysis to the fluorescence mode of analysis.

4 Claims, 6 Drawing Figures

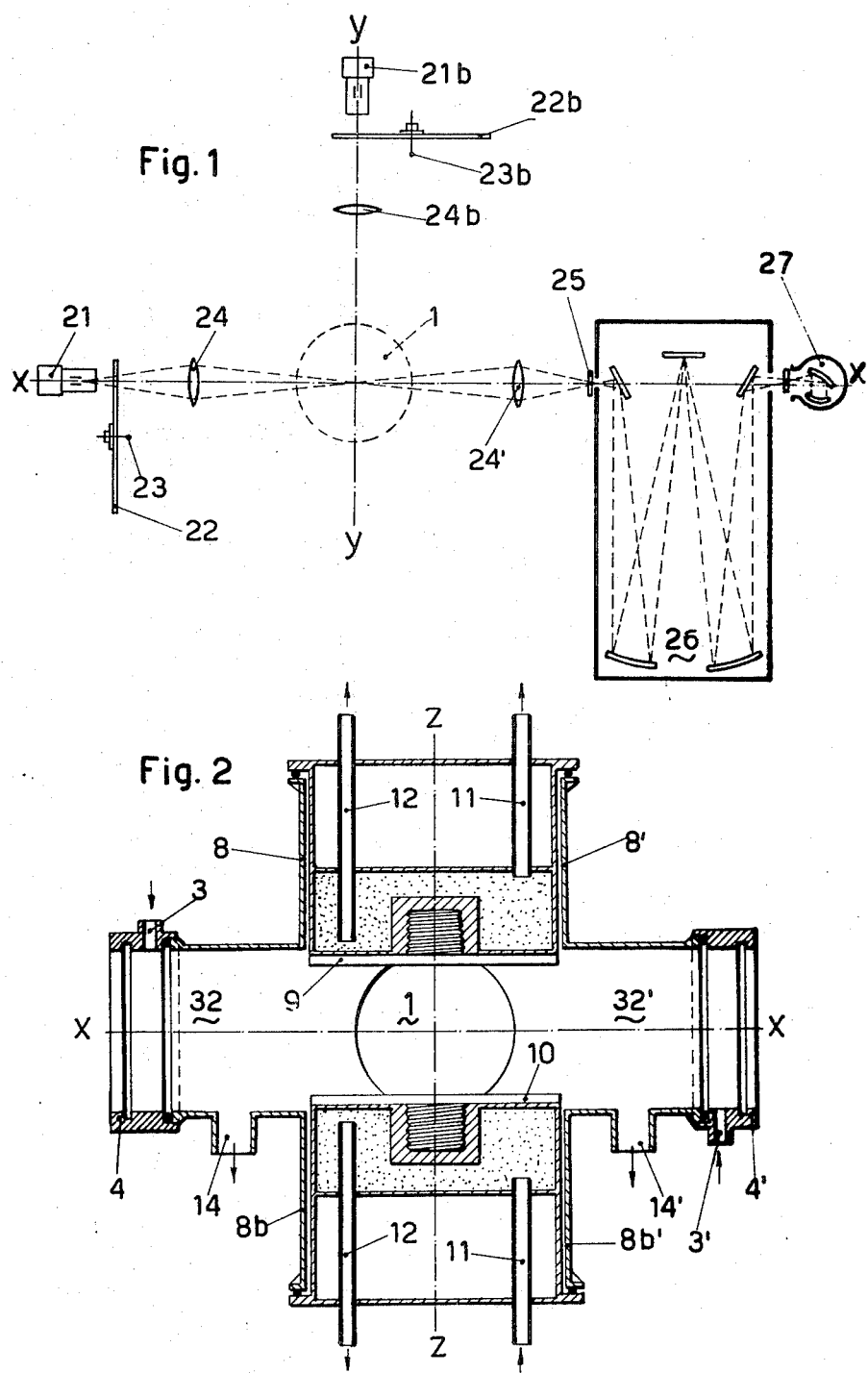

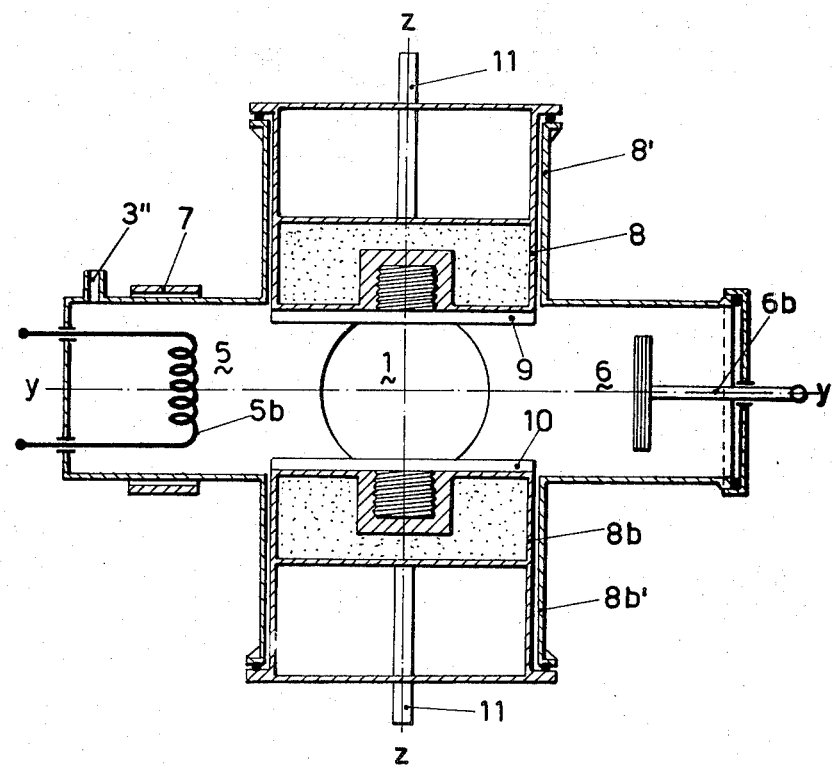

APPARATUS AND METHOD FOR DETERMINING THE CONTENT OF CHEMICAL ELEMENTS IN A SOLID SAMPLE

The present invention relates to an apparatus to be used in the spectrophotometric analysis and more specifically in those analysis wherein the atomic absorption and atomic fluorescence techniques are applied, that is those techniques wherein an ionic bombardment is used for the direct atomization of a solid sample to be analyzed; the term "atomization" being here employed to signify a process whereby from a sample the constituent atoms are released in a basic atomic form.

The spectrophotometric analysis through atomic absorption, as well known, consists of measuring the attenuation of the radiation emitted by a source at a given wavelength which attenuation is caused when the radiation is passed through a space wherein the atoms are contained of a chemical element which atoms are at the temperature and pressure conditions suitable for causing the absorption of said radiation and therefore will be called hereinafter absorbing atoms.

The spectrophotometric analysis through atomic fluorescence consists of measuring the intensity of the radiation emitted at suitable conditions, by atoms of a given chemical element when they are excited at appropriate characteristic frequencies, which atoms will be called hereinafter fluorescent atoms.

The apparatus usually employed for applying the above techniques comprise the following major components:

radiation sources (adapted for the absorption technique and for the fluorescence technique respectively);
focalizing systems;
atomizing devices that is devices for producing the absorbing and/or fluorescent elements in a basically atomic form;
a measuring cell which may be also called an analytical cell;
a monochromator;
measuring systems of the intensity of the radiation concerned.

The present invention specifically relates to devices used for producing in continuous operation the absorbing and fluorescent atoms and to the methods for using the same.

In general the means currently used for releasing the atoms from a solid sample to be analyzed (particularly in the case of absorption techniques) may be classified on the grounds of their operation which may be continuous and discontinuous; the term continuous being meant to signify an analysis apparatus wherein the composition of atomic vapor released from the sample is constant throughout the operation period, which is not the case with the discontinuous operation. The discontinuously operating means include the following: chemical flames produced by the reaction of a combustible with a combustion supporter; high-temperature furnaces under vacuum, plasmas induced by radio frequency electromagnetic fields. Continuously operating means include: some particular hollow cathodes, lasers etc.

Leaving aside the discontinuous operating systems because of their dissimilarity from this invention, the above-mentioned continuous operation systems suffer from the following drawbacks:

1. The composition of the atomic vapor obtained through the atomization of the solid sample is different from the composition of the latter both because of the selective character of the volatilization of the sample (that is the components of the sample do not volatilize simultaneously due to the different vaporization temperature) and because a gaseous diffusion may take place such diffusion being favored by the operating pressure which is rather high; which diffusion, if not kept to a minimum, would modify the composition of the atomized substance along its way across the cell with respect to the sample composition.

2. Operating hindrances such as the long period required for attaining a steady operation of the apparatus.

3. A limited applicability as far as the operating pressure is concerned. More specifically, when hollow cathodes are employed it is practically impossible to operate at pressures below about 100 microns Hg. in as much as at low pressures and with cathodes of the current sizes the mean free path of electrons is too long to produce a sufficient ionization. On the other side an effective increase of the cathode dimensions is not feasible.

With the apparatus of this invention the above drawbacks and hindrances are overcome or minimized. In fact:

1. By means of an effective cooling of the sample, the selective volatilization of the different components of the sample is prevented which is typical of those apparatuses which operate a thermal volatilization.

2. Very little time is consumed for carrying out an analysis which may be reduced in the order of a few minutes.

3. The operating pressure range is very wide. A further advantage of this apparatus is that the amount of sample which is atomized in a time unit can be readily and easily varied.

Still another advantage is that the specific atomization of the sample can be made to change with time that is it can be modulated with time according to a predetermined rule whereby measures can be simply effected with the double beam method.

Finally by this apparatus both the above-mentioned techniques of analysis through absorption and through fluorescence can be carried out, the simple interchange of some parts of the apparatus being required for shifting from one technique to the other; the sample being left at its position within the analytical cell while the analysis technique is changed.

The above objects and advantages are achieved with the apparatus of this invention by producing a plasma at low pressure (in the range from about 0.1 to about 50 microns Hg.) in a space wherein an appropriate plasmogen gas (argon is cited as a nonlimitative example) is contained and wherein two electrodes are placed which are substantially flat and facing each other at a distance which can be adjusted; one of said electrodes functioning as a cathode and comprising the sample to be analyzed. Across said electrode an electric field is applied by known means.

The above-mentioned plasma is produced in this apparatus by said electric field acting on the electrons spontaneously emitted by the cathode. This action would be perfectly adequate if the pressure within the analysis cell were higher than about 10 microns; however at lower pressures it is necessary and convenient to provide an auxiliary source of electrons and a corresponding accelerating collecting electrode along with a magnetic field capable of causing the electrons to move along a spiral path whereby, as well known, the collision probabilities of the electrons and of the plasmogen gas atoms are increased. The positive ions of the plasma so produced are used as particles for bombarding the sample to be analyzed and atomizing it. The atoms so obtained take part into the absorption or fluorescence process. The low pressure at which the atomizing process occurs according to this invention minimizes the diffusion of the atoms into the gaseous phase along their path from the cathode to the anode.

With regards to the adaptability of this apparatus to either of the analysis techniques this is obtained through the particular construction of the apparatus. In fact this comprises two radiation sources one for the absorption technique and another for the fluorescence technique, a single monochromator, a single measuring system and a single analytical cell the center of which is aligned with both of said sources of which one only at a time is operating. The analytical cell directly communicates with two pairs of chambers, the chambers of one pair being aligned with one another, with the first named source of radiation and with the inlet slit of the monochromator while the chambers of the other pair are aligned with one another and with the second named source of radiation, the chambers of each pair being placed at two opposite sides of the analytical cell and the centerlines of the two pairs being made to cross at the center of the analytical cell. Each chamber at the free end thereof, that is the end opposite to the analysis cell, is equipped with an implement such as an optical window or an electron source or an electron accelerating and capturing electrode. Two of these implements, that is those facing respectively the two radiation sources, are to be interchanged for shifting from one technique to the other, all the rest of the apparatus remaining unchanged.

This invention will be more clearly understood from the following description and accompanying drawings which illustrate a preferred embodiment given by way of a nonlimitative example thereof. In the drawings:

FIG. 1 shows schematically in plan view the apparatus of this invention;

FIG. 2 shows a vertical cross section of the analytical cell and of a pair of chambers fitted for the absorption technique. This is a vertical section of the equipment of FIG. 5 along the axis X—X thereof;

FIG. 3 shows a cross section of the analytical cell and of a pair of chambers fitted for the absorption technique. This is a vertical section of the equipment of FIG. 5 along axis Y—Y thereof:

Figure 4:
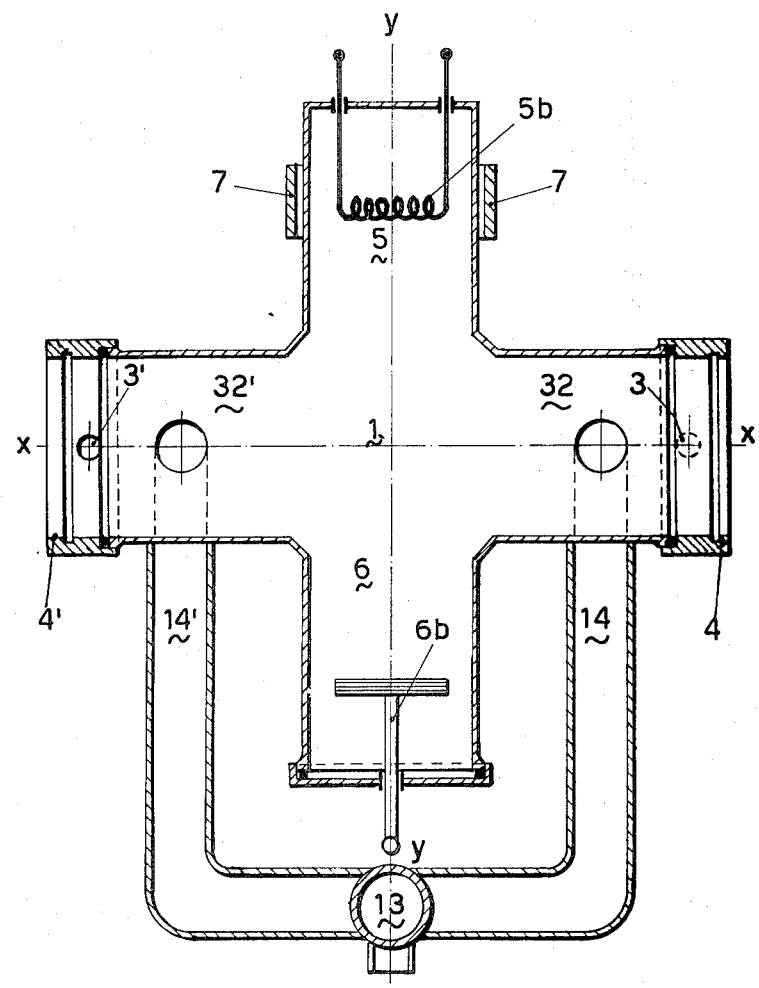
FIG. 4 shows a cross section of the analytical cell and of a pair of chambers fitted for the absorption technique. This is a cross section of the equipment of FIG. 5 along a plane containing axes X—X and Y—Y thereof.

Referring now to FIG. 1, the reference numbers 21 and 21b indicate the radiation sources which are used respectively for the absorption and for the fluorescence technique which sources may comprise, for instance, hollow cathode lamps, discharge tubes, microwave lamps, arcs, etc. The sources, in any case, should be capable of producing some of the characteristic frequencies of the element under examination. Reference numbers 22 and 22b indicate two modulators for the radiation beams emitted by sources 21 and 21b respectively. Each modulator comprises a disk with sectors that are alternately opaque and transparent to the respective radiation beam. Such discs are rotated by means of motors 23 and 23b and are so located with respect to the respective beam that the latter is periodically interrupted thereby at a frequency which depends on the number of sectors of the disc and on the speed of the respective motor. This type of modulator is recited as an example only of the several modulators which may be used for this purpose which may act either on the radiation beam or on the source itself.

By reference numbers 24, 24' and 24b two focalizing systems are indicated one of which comprising items 24, 24' is effective for focalizing the beam emitted by source 21, that is the source used for the absorption technique while the other comprising items 24b and 24' is effective for focalizing the beam emitted by source 21b that is the source used for the fluorescence technique. In both cases the radiation beam is led to pass through analytical cell 1 which is adapted to function both for the absorption and for the fluorescence techniques. In the first case the image of source 21 is focalized on the inlet slit 25 of a monochromator 26 which is followed by a detecting and measuring system 27; in the second case the area of high fluorescence within cell 1 is focalized on the same slit 25.

The detecting and measuring system 27 is of any conventional type adapted for amplifying and detecting an alternating signal as produced by either modulator 22 or modulator 22b.

As shown by FIGS. 2, 3, 4, 5 which all relate to the arrangement for analysis by the absorption technique, cell 1 is directly communicating with a first chamber 32, a second chamber 32' a third chamber 5 and a fourth chamber 6. Chambers 32 and 32' are placed at opposite sides of cell 1 and at their ends farthest from cell 1 are closed by removable optical windows 4 and 4' respectively. Windows 4 and 4' are provided each with an inlet 3 and 3' through which a plasmogen gas is supplied to chambers 32 and 32' respectively when said windows are fitted thereon. The inlets 3 and 3' are adjacent to optical windows 4 and 4' in order to weep off any condensation therefrom. Chambers 5 and 6 are also placed at opposite sides of cell 1 and chamber 5 is also provided with a supply inlet 3'' for the plasmogen gas. The purpose of chamber 5 is for receiving an electron source 5b thereinto while the purpose of chamber 6 is for receiving an electrode 6b as required for accelerating the electrons flowing from chamber 5 and collect them on the same electrode.

A coil 7 embraces chamber 5 at the outside thereof which coil is fed with direct current from a source not shown. Coil 7 may be placed as well within chamber 5.

Figure 6:
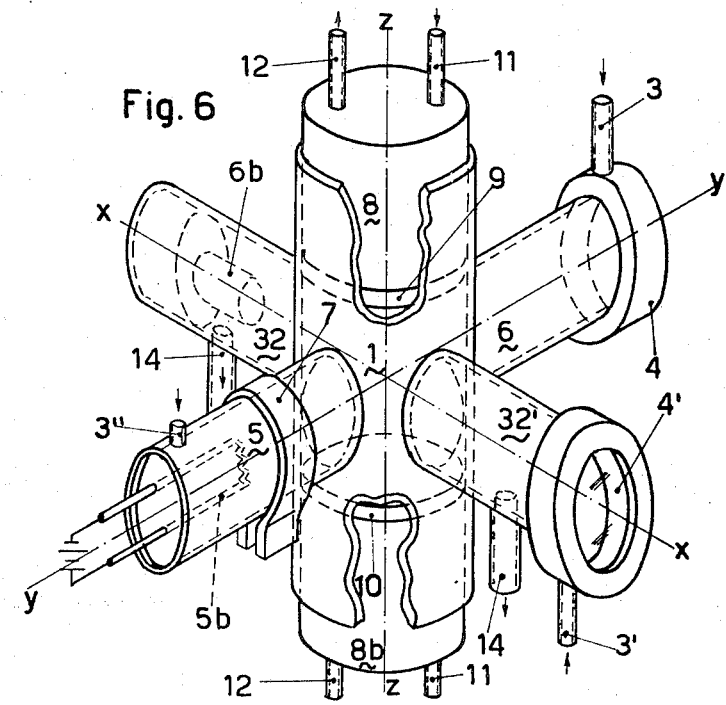
FIG. 6 shows the same assembly of FIG. 5 but equipped for the analysis by the fluorescence technique.

When operating with the fluorescent technique, optical windows 4 with the related gas inlet 3 is placed at the end of chamber 6 and electrode 6b is placed at the end of chamber 32 (see FIG. 6).

Two electrodes 9 and 10 are included within cell 1 of which the first comprises the sample to be analyzed. Both electrodes have the form of a flat disc and each of them is electrically, thermally and mechanically connected to a respective support means 8, 8b. As an example, the connection between the latter and the related electrode may be as illustrated by FIGS. 2 and 3 that is by means of a threaded projection of the electrode which engages a threaded recess of the support means.

The constituent material of electrode 10 is inert with respect to the present process. Support means 8, 8b are identical to one another, each of them comprising a short thin walled cylinder which fits into a corresponding receptacle 8', 8b' extending from the opposite sides of cell 1 around an axis at right angles with the plane containing the axes of said pairs of chambers. At their end farthest from cell 1, support means 8, 8b are provided with a flange adapted to make a vacuum tight seal with a corresponding flange of receptacles 8', 8b'. Support means 8, 8b may be made of different lengths for changing the distance between electrodes 9, 10. At their ends close to cell 1 support means 8, 8b have a partition by which a space is defined wherein a refrigerating fluid is circulated which is fed to each support body through pipes 11 and discharged therefrom through pipes 12.

Electrodes 9 and 10 are electrically connected to a power source (not shown) such that electrode 9, which comprises the sample, be caused to function as a cathode. The power source may be a DC source or an AC source. In the first case there is no problem for connecting the source to the electrodes. On the other hand, in the second case a feeder should be inserted between the source and the electrodes which feeder should include a means for blocking the direct current component of the total current circulating through the circuit wherein the electrodes are included in order that a negative charge be present on the electrode which function as a cathode that is electrode 9. Analytical cell 1 (FIG. 4) is also connected through chambers 32 and 32' and ducts 14, 14' to a vacuum pump 13. As mentioned above, analytical cell 1 is adapted for functioning both as an absorption cell and as a fluorescence cell.

When operating with the fluorescence technique, window 4 and electrode 6b are interchanged in such a way that the configuration of FIG. 6 is obtained. Then the radiation from source 21b is directed through window 4 and causes the fluorescence of the atomized sample within cell 1; as a consequence, a fluorescence radiation beam emerges from cell 1, through window 4' which beam is at right angles to the beam emerging from source 21b.

With regards to the structural materials, chambers 32, 32', 5 and 6 along with ducts 11, 12, 14 and 14' may be made of any material either heat and electricity conducting or not but otherwise compatible with the apparatus operation. Chamber 5, when surrounded by induction coil 7, should be of nonmagnetic material for avoiding any influence on the same magnetic field by chamber walls. As a nonlimitative example, glass and plastics or metals can be used as structural materials for chambers 1, 32, 32', 5 and 6. The electrode support means 8, 8b may be made of any materials provided they are good heat and electricity conductors.

Obviously, many solutions different from the above described may be resorted to both for enhancing the absorption process, such as multiple passage arrangements, and for suppressing the need of interchanging window 4 with electrode 6 when shifting from one technique to the other. To the latter purpose stationary supplementary windows may be for instance provided at the free end of chamber 6, while a fifth chamber about an axis different from axis X—X may be added for mounting electrode 6b thereon.

Figure 5:
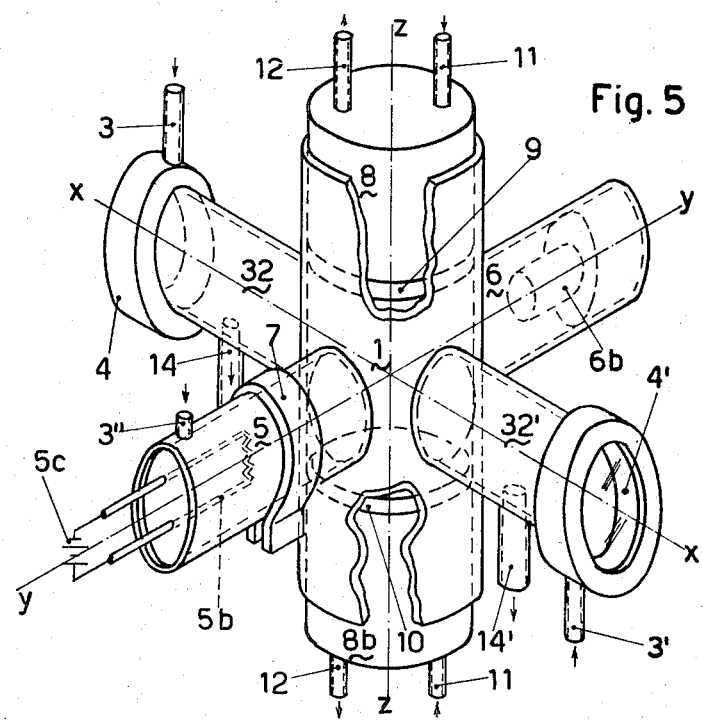
FIG. 5 shows an isometric view of the assembly comprising the atomizing means, the analytical cell and related chambers equipped for the analysis by the absorption technique.

The operation of the above-described apparatus when operating with the absorption technique, is as follows:

After lighting lamp 21 of the element to be determined, the radiation beam emitted thereby is aligned and collimated on inlet slit 25 of monochromator 26. By the latter a particular wavelength is selected among the characteristic wavelengths of said element. Modulator 22 is then started and the intensity of the radiation emitted by source 21 is measured. Electrode 9 comprising the sample to by analyzed is then fitted on support means 8. The components of the equipment of FIG. 5 are then assembled in such a way that a vacuum tight sealing is obtained of cell and chambers 32, 32', 5 and 6. Pipes 11 and 12 are then connected to the source of refrigerating fluid and the latter is fed to the inside of support means 8, 8b. Cell 1 is then connected to vacuum pump 13 whereby the required vacuum is obtained within cell 1. Plasmogen gas is then admitted to cell 1 through inlets 3, 3' and 3" until the desired operating pressure is steadily maintained within cell 1. Components 8b, 10 which are to function as an anode and components 8, 9 which are to function as a cathode are connected to a voltage generator (not shown) which, depending on the sample to be analyzed, may be a DC generator or a generator of alternate current at suitable frequency. Coil 7 is then connected to its proper power supply (not shown). Electron source 5b is connected to its power supply 5c, while the same source and electrode 6b are connected to the same voltage generator as electrodes 9 and 10.

As a consequence of the above preparatory steps a low-pressure plasma is formed within cell 1 and at the same time the atomization of the sample begins. The sample atoms released from cathode 9 move across the space between electrodes 9 and 10 and along their travel intercept the radiation beam from lamp 21 which beam, at certain frequencies, is attenuated thereby; the amount of the attenuation being a function of the number of atoms of the element under examination which are present in the flow of atoms through cell 1, the concentration in the sample of the element under examination is determined by measuring the amount of attenuation at one of the characteristic frequencies of the element. At this moment, the radiation intensity which reaches the measuring system 27 is measured. From this intensity and the corresponding intensity previously measured when no atomization occurred the concentration in the sample of the element under examination is determined.

When a series of samples are to be successively examined, the following is the procedure for changing from one sample to next in the series:

cell 1 is cut out from pumping system 13 by means of valves not shown;
all the atomization equipment is deenergized;
atmospheric pressure is let into cell 1;
support means 8 along with cathode 9 are withdrawn from receptacle 8';
a fresh cathode 9 comprising the sample to be examined is substituted for the used one;
support means 8 along with cathode 9 are inserted into receptacle 8' and the above-mentioned steps are again carried out.

The operation of the apparatus in the case of the fluorescence technique is as follows:

After lighting lamp 21b of the element to be measured, the radiation beam from lamp 21b is collimated on cell 1. Modulator 22b is then started. Monochromator 26 is then adjusted at a particular characteristic wavelength of the element to be measured. The image of the fluorescence area within cell 1 is focalized on inlet slit 25 of the monochromator. The atomizing equipment is then energized the same as for the absorption technique. The intensity of the radiation is then measured. From this measure and the corresponding measure obtained without atomization the concentration in the sample of said element is determined.

What is claimed is:

1. An apparatus for directly determining the content of chemical elements in a solid sample, which apparatus comprises an analytical cell, a vacuum system connected to said cell and capable of producing a high vacuum therein, two main electrodes in said cell which are connected to a direct current generator, a source of radiation capable of radiating at one of the characteristic wavelengths of the element to be measured, a measuring system of the radiation intensity including an inlet slit; which apparatus in addition to the currently used components further comprises two pairs of elongated chambers directly communicating with said cell, the chambers of each pair being disposed at opposite sides of said cell and extending outwardly therefrom; the chambers of one pair being provided with inlet and outlet optical windows at their ends farthest from said cell and being aligned with one another, with said radiation source, with the center of said cell and with said slit; the chambers of the other pair being aligned with one another and their axis making an angle with the axis of said one pair; an electron source being received into one chamber of said other pair and an electron accelerating and collecting electrode being received into the other chamber of said other pair; said apparatus being also provided with two receptacles extending from said cell at opposite sides thereof and around an axis which is at right angles with the plane containing the axes of said two pairs of chambers; in which receptacles said main electrodes are received, which consist of two flat discs of which one comprises the sample to be analyzed; said chambers being provided with inlet means for supplying a plasmogen gas thereinto and into said cell; said chambers being also connected to a vacuum system capable of producing a vacuum down to 0.1 microns Hg. within the vacuum tight space defined by the walls of said chambers and cell all together; whereby when the various components of said apparatus are energized, the gas within said cell is transformed into a plasma as a consequence of the electric field produced by said main electrodes and of the ionizing collisions of said electrons with the atoms of the plasmogen gas and the sample is nonselectively atomized by the positive ions of said plasma colliding with the sample and the amount of the element in the sample is determined by measuring the attenuation of said radiation due to its passing through said analytical cell.

2. An apparatus as per claim 1 wherein said chamber into which said electron source is received is further provided with a coil connected to a direct current source whereby the electrons emitted by said electron source are caused to follow a spiral path.

3. An apparatus as per claim 1 wherein a second radiation source adapted for producing a fluorescence of the atomized sample is provided in alignment with said other chamber of said other pair of chambers and wherein the inlet optical window of said one pair of chambers and said electron accelerating and collecting electrode are readily interchangeable whereby said apparatus may be changed from the absorption mode of operation to the fluorescence mode of operation and vice versa by simply interchanging said interchangeable components.

4. An apparatus as per claim 1 wherein in addition to said two pairs of chambers a fifth chamber is provided the axis of which makes an angle with the axes of said two pairs of chambers and lies on the same plane thereof, said chamber being adapted for receiving said electron accelerating and collecting electrode; said apparatus being also provided with a second radiation source adapted for producing a fluorescence of the atomized sample which second radiation source is aligned with said other chamber of said other pair of chambers and is further provided with an additional inlet optical window to be applied to the last named chamber when said electron accelerating and collecting electrode is removed therefrom and transferred to said fifth chamber whereby the apparatus is changed from the absorption mode of operation to the fluorescence mode of operation by simply transferring said electron accelerating and collecting electrode and fitting said additional optical window as above described.

* * * * *